Sept. 3, 1940.  C. D. HAVEN  2,213,468
MULTIPLE GLASS SHEET GLAZING UNIT
Filed Dec. 26, 1935   3 Sheets-Sheet 1
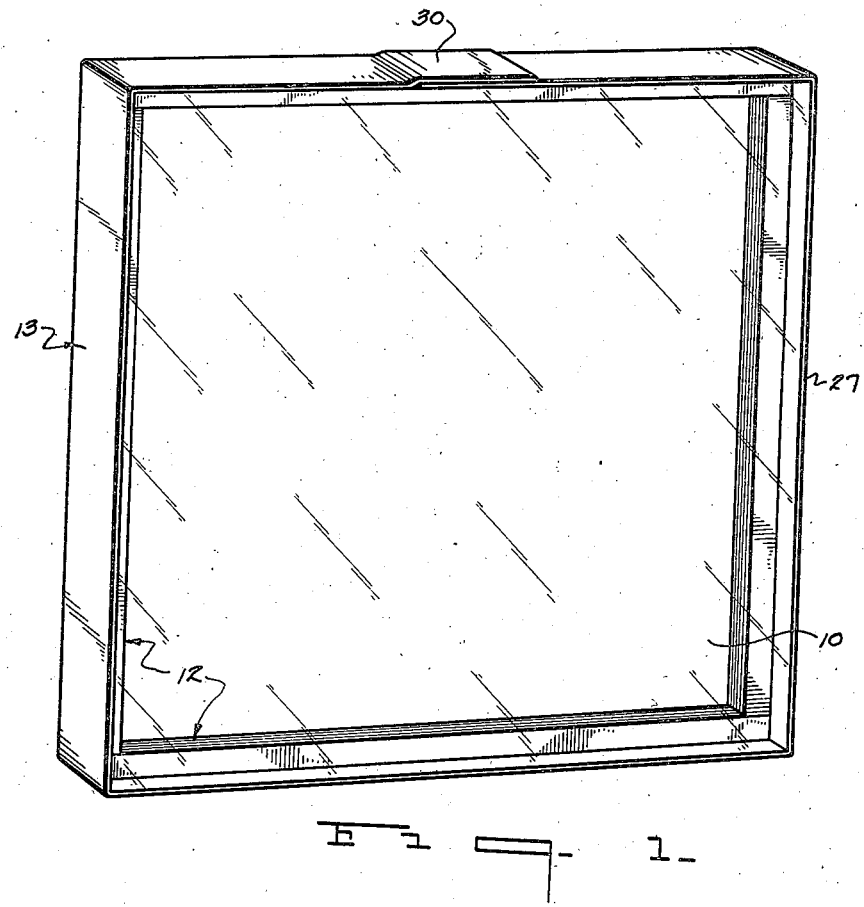
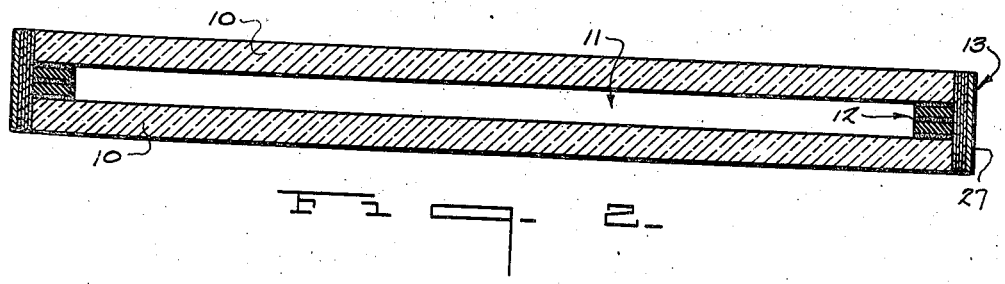
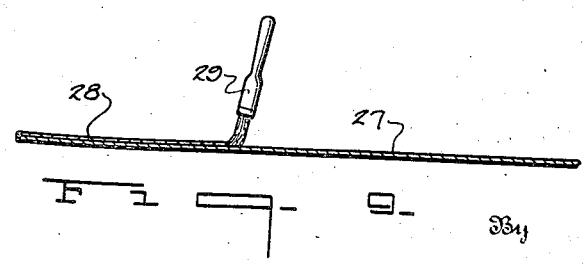
Inventor
CHARLES D. HAVEN.
By Frank Fraser
Attorney

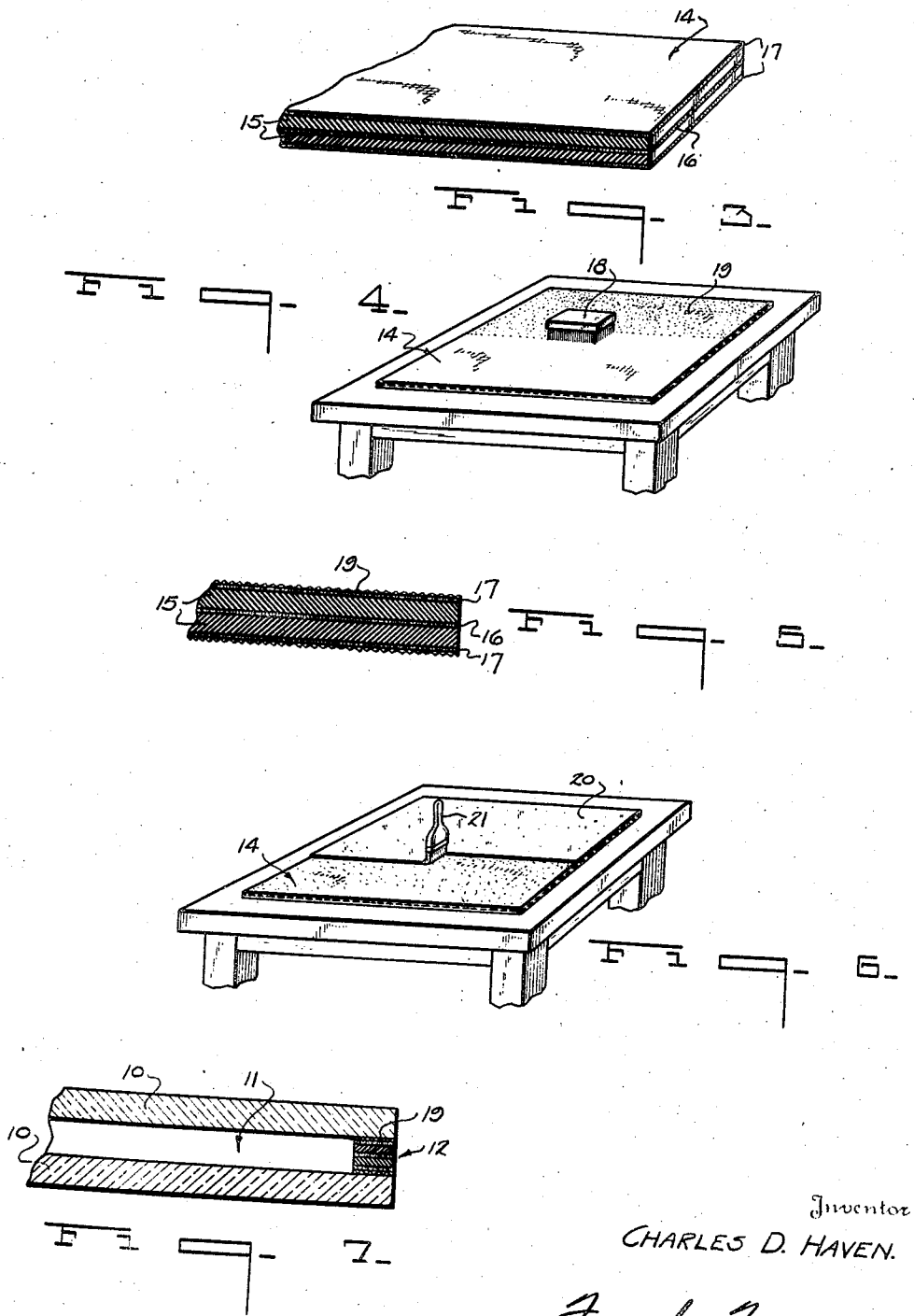

Sept. 3, 1940.   C. D. HAVEN   2,213,468
MULTIPLE GLASS SHEET GLAZING UNIT
Filed Dec. 26, 1935   3 Sheets-Sheet 3
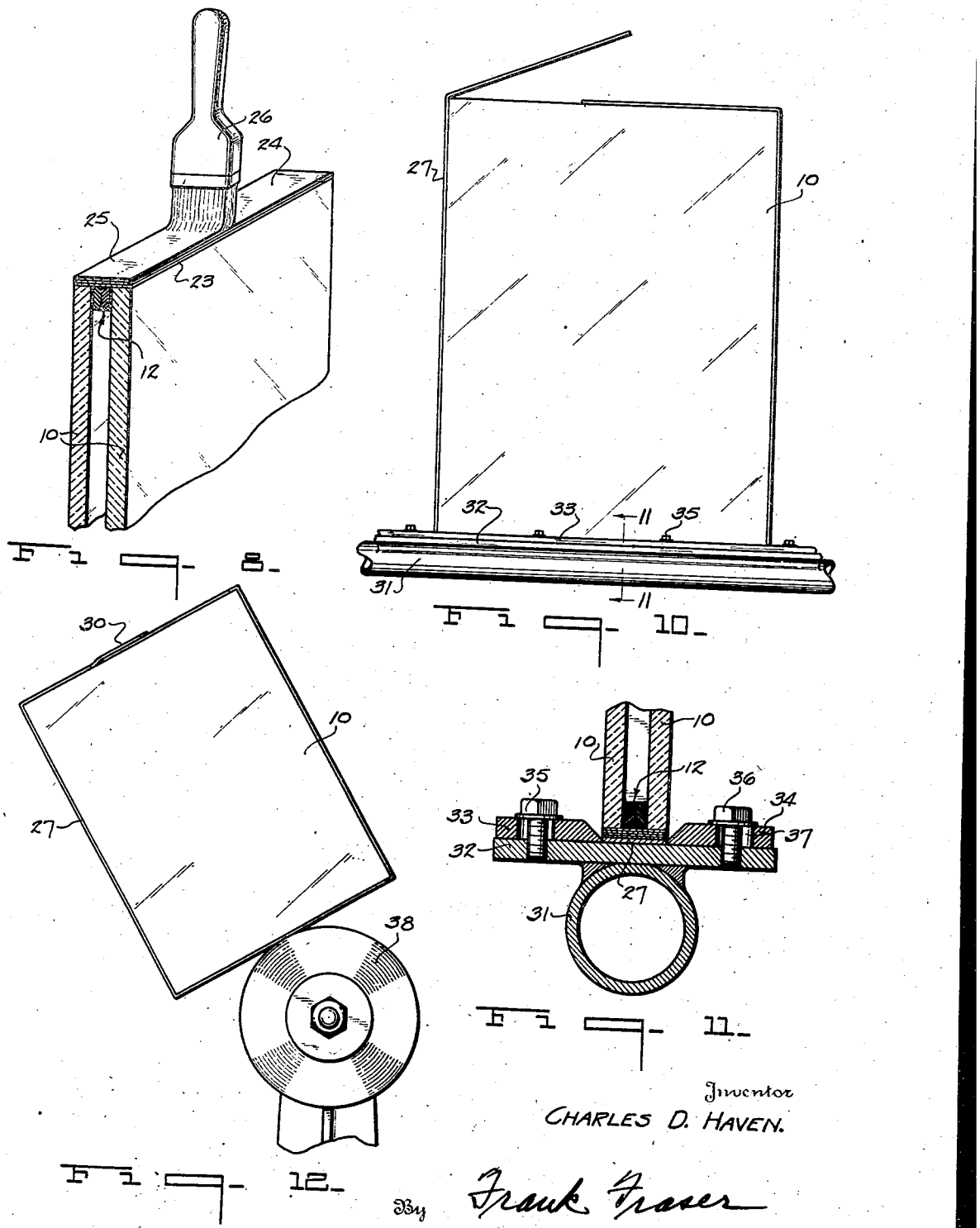

Patented Sept. 3, 1940

2,213,468

UNITED STATES PATENT OFFICE 2,213,468

MULTIPLE GLASS SHEET GLAZING UNIT

Charles D. Haven, Toledo, Ohio, assignor, by mesne assignments, to Libbey-Owens-Ford Glass Company, Toledo, Ohio Application December 26, 1935, Serial No. 56,188

8 Claims. (Cl. 20—56.5)

The present invention relates broadly to window constructions and more particularly to an improved multiple glass sheet glazing unit.

The general type of glazing unit with which the invention is concerned consists preferably, though not necessarily, of two sheets of glass arranged in parallel and maintained in spaced relation by a plurality of separator or spacer strips completely surrounding the marginal portions of the glass sheets and bonded thereto by means of a suitable adhesive or cement applied to the strips and/or glass. The space or chamber between the sheets is preferably filled with dehydrated air or nitrogen and the separator means constitutes in effect a seal which hermetically seals the space between the glass sheets.

The use of double glazing has long been desirable wherever it is important to reduce heat transfer and to prevent condensation of moisture upon glass in glazed openings. Thus, a double glazed window possesses much greater insulating properties than a single sheet or plate of glass and has the effect of greatly retarding the escape of heat therethrough from the inside of a building during the winter as well as minimizing the passage of heat into the building from the outside during the summer.

Among the advantages to be gained by the use of double glazing are that it makes possible a lower initial cost of heating plant installation in buildings; reduces the heating cost of buildings by a material saving of the heat loss through single glass windows; raises the low temperature in proximity to windows in winter time; is sweat and frost resisting, thereby providing clearer vision and cleaner windows; permits higher humidity without condensation for health purposes in cold weather; replaces storm windows; and saves material loss in cooled or refrigerated rooms, refrigerators, and display cases.

The successful use of this type of glazing unit is largely dependent upon the maintaining of the space between the two sheets of glass hermetically sealed, since should this seal be broken, permitting air to enter and circulate between the sheets, the efficiency and insulating effect of the unit would be materially reduced.

The breaking down of the seal around the edges of the glass sheets will not only materially lessen the insulating effect of the glazing unit, but in addition, moisture and other foreign matter will be permitted to seep in between the sheets and to set up or promote a staining or clouding of the inner surfaces of the glass. Further, the surfaces may become otherwise soiled, and as it is impossible to reach them for cleaning, the clarity and transparency of the glass is impaired. Internal condensation likewise takes place between the glass sheets which is of course highly objectionable.

There are a number of conditions which tend to set up strains in the glazing unit and to break down the seal around the edges thereof, such as the differential in expansion and contraction of the two sheets of glass as well as the changes of internal pressure due to changes of the temperature of the air within the space between the glass sheets and also from changes in barometric pressure of the outside atmosphere. The strains set up by these varying pressure conditions coact with the expansion or contraction of the two sheets of glass in a tendency toward breaking down the bond between the glass sheets and separator strips.

It is an object of this invention to provide a multiple glass sheet glazing unit of the above character embodying novel means for permanently hermetically sealing the edges of the unit and which will serve to protect the separator strips as well as the bond between the said strips and glass from the atmosphere and other elements to which the unit may be subjected when in use, thereby preserving the predetermined conditions established within the structure at the time of manufacture.

Another object of the invention is to provide a weatherproof protective seal which will not only serve to maintain the glazing unit both air-tight and water-tight but which will also resist the action of the usual oils, putties, and all other substances to which the glass is subjected, as well as preventing seepage thereof into the space between the glass sheets which would result in a very rapid deterioration of the unit as a whole.

A further object of the invention is to provide a weather-proof protective seal which, under the pressure differences to be found in practice, may be considered absolutely non-porous and which will not permit the passage of moisture in vapor form or the passage of other gases through its structure into the space between the glass sheets.

Other objects and advantages of the invention will become more apparent during the course of the following description when taken in connection with the accompanying drawings.

In the drawings wherein like numerals are employed to designate like parts throughout the same, Fig. 1 is a perspective view of a multiple glass sheet glazing unit constructed in accordance with the present invention;

Fig. 2 is a transverse vertical section thereof;

Fig. 3 is a fragmentary perspective view, partly in section, of a sheet of laminated material from which the separator strips can be made;

Fig. 4 illustrates the treatment of the surfaces of the sheet of Fig. 3;

Fig. 5 is a fragmentary sectional view showing in exaggerated manner the surfaces of the sheet after being treated;

Fig. 6 shows diagrammatically the application of an adhesive material to the treated sheet;

Fig. 7 is a fragmentary sectional view illustrating diagrammatically the type of bond obtained with this type of separator strip;

Fig. 8 is a perspective view showing the coating of the edges of the unit with sealing material;

Fig. 9 is a view showing the application of sealing material to the metallic stripping;

Fig. 10 is a side view of one form of apparatus which may be used in initially applying the metal stripping to the edges of the unit;

Fig. 11 is a transverse section taken substantially on line 11—11 of Fig. 10; and Fig. 12 is a diagrammatic view showing the manner in which the metal stripping may be finally secured to the edges of the unit.

With reference to the drawings, there is illustrated in Figs. 1 and 2 a multiple glass sheet glazing unit including the two sheets of glass 10—10 arranged face to face but slightly spaced from one another to provide an air space 11 therebetween. The two sheets of glass are held apart in properly spaced relation by means of the separator strips 12 completely surrounding the marginal portions of the glass sheets and arranged substantially flush with the edges thereof. Associated with the edges of the glass sheets and extending completely around the glazing unit is the improved weather-proof protective seal 13 which serves to effectively protect the spaced strips 12 as well as the bond between said strips and glass from the atmosphere and other elements to which the glass may be subjected when in use, thereby preserving the predetermined conditions established within the structure at the time of manufacture.

In the fabrication of the glazing unit, the glass sheets 10—10 are first thoroughly cleaned to remove all traces of dirt, grease, and other foreign matter. Separator strips 12 of the desired width and thickness and coated with a suitable cement or adhesive material are then properly assembled with the glass sheets and the said strips and sheets secured together by the application of heat and pressure to form a unitary structure. The improved seal 13 is then applied around the edges of the unit outwardly of the separator strips 12.

Although the invention is not limited to the use of any particular type of separator strips, it is preferred that the strips 12 possess a slight degree of flexibility which is sufficient to prevent fracture of the glass due to the expansion strains but with enough firmness to withstand the usual compression and tension present without undue movement of the glass sheets toward or away from one another. The slight flexibility is advantageous as it lessens the load, so to speak, on the adhesive employed which is not the case when a non-flexible or practically rigid type of substance is used as the separator element.

A form of separator strip which has proven satisfactory is one made from a sheet of laminated rubber compound covered on both sides with a suitable fabric. In Fig. 3 is shown a laminated sheet 14 comprising two laminations 15 of rubber composition between which is arranged a layer of fabric 16, with both outer surfaces of the rubber laminations being faced with the fabric material 17. The number of rubber and fabric laminations can of course be varied as desired.

The sheeting 14 can be produced by cementing together layers of the rubber composition to give the desired thickness or the layers may be made with cloth or other fabric inter-layers. The cloth insertions seem preferable to other insertions, particularly during cutting of the sheeting into strips of the desired width, and in any event best results have been obtained when the outer surfaces of the laminated rubber sheeting are covered with the fabric layers 17.

To prepare the laminated rubber fabric sheeting for use as a separator strip in a double glazing unit, both outer surfaces thereof are thoroughly cleaned and this may be accomplished by scrubbing the rubber sheeting 14, as shown in Fig. 4, with a wire brush or similar implement 18. To facilitate cleaning, gasoline, naphtha, water, or other liquids can be applied during the scrubbing operation, to remove ordinary dirt, dust, soapstone or other materials that may be present as a result of the rubber manufacturer's operations.

The wire brush 18 is used not only for the purpose of removing dirt but to also roughen the fabric material 17 as indicated in the area designated by the numeral 19 upon the sheet 14 in Fig. 4. This cleaning of the surfaces and roughening of the fabric permits subsequent penetration of the adhesive coating into the body of the separator material, at least to a sufficient depth to give proper adhesion to the glass. The increased absorbing power of the roughened fabric provides spaces into which any excess adhesive on the fabric surface may be forced to penetrate when pressure and heat are applied to the assembled parts. By reason of this penetration, excess of adhesive beyond the edges of the fabric may be reduced or prevented.

In Fig. 5 is shown diagrammatically the effect of the cleaning and roughening treatment of the fabric coatings 17 wherein the surfaces are serrated as at 19 in a manner to produce a plurality of spaced projections. The roughening treatment also serves to open up the spaces in and around the individual fibers of the threads of which the fabric is composed, allowing for sub-surface penetration of the adhesive later applied. The importance of the roughened surface will be pointed out more in detail later, and while the drawings have been exaggerated for purposes of illustration, nevertheless the roughening treatment in actual practice is such that the serrations or projections 19 are readily discernible and have a direct bearing on the type of bond obtained between the glass and separator strips.

After both surfaces of the sheet 14 have been cleaned, they are ready to be coated with the adhesive material and preferably the adhesive material is applied immediately prior to intended use of the strips so that it does not become unduly hardened. However, this is not absolutely necessary as a form of adhesive is and should be used that can be subsequently rendered adherent upon the application of suitable solvents and/or heat. The adhesive may be put upon the sheeting in any one of a number of different ways, and in Fig. 6 the adhesive coating 20 is applied by means of a brush 21.

After coating both sides of the sheet with one or more applications of adhesive material and drying thereof, the said sheet is cut into strips of proper width and this may be done with any suitable type of cutting machine. The separator strips are then properly positioned between the two sheets of glass and a slight hand pressure upon the sheets will serve to temporarily secure the said sheets and strips together. The assembled unit is then subjected to a heat and pressure treatment, such as in an ordinary platen press, to effect the desired adhesion between the separator strips and glass. It will of course be understood that the invention is not limited to any particular method of pressing the unit or to the use of any particular pressing apparatus, so that no specific method and/or apparatus is disclosed herein.

Considering more in detail the reasons for using the fabric coated rubber sheeting 14 and roughening of the fabric, as shown in Figs. 4 and 5, attention is directed to Fig. 7 wherein is illustrated diagrammatically what may be termed an interrupted or point contact type of adhesion which is obtained from using separator strips cut from the sheeting 14. Thus, in this figure, the separator strip 12 between the glass sheets 10—10 is bonded to the said sheets through the intermediary of the serrations 19 and adhesive material. It is quite apparent that the separator 12 has a roughened surface so that there is no continuous contact between the said strip and glass but that, on the contrary, the separator is bonded to the glass at a plurality of spaced points. The interrupted or point contact form of adhesion thus obtained is perfectly adequate and, what is of great importance, it is permanent. In fact, it is permanent even though small areas of the bond may break down because in view of the interrupted character of adhesion, there is no tendency for the separation to creep or spread over the entire area. A weakness or break at any one point of contact of the adhesive to the glass surface has no effect on adjacent points of contact, and consequently separation does not take place from strains up to the breaking point of the glass itself.

In addition to the roughened character of the surfaces, the separator strip should have a degree porosity sufficient to permit penetration of the adhesive below the surface and to also afford a place for any excess adhesive that may be present. With the interrupted type of adhesion, coupled with the porosity of the separator material, the slight amount of excessive adhesive fills the cavities between the spaced projections and is taken up by the material itself so that the globules do not form to any noticeable extent within the space between the glass sheets.

It has been found that shellac makes an exceedingly fine adhesive and while other adhesives may of course be used, shellac is ideal because alcohol used as a solvent for shellac can be readily evaporated under heat during the fabrication of the unit. An adhesive can be made by mixing one pound of shellac and four gallons of 180 proof alcohol. Shellac itself forms one of the best adhesives for glass if protected from excess of moisture or water which is the case here.

In applying the shellac to the cleaned and roughened fabric surfaces of the sheeting 14, a thin layer serving as a primary coat is preferably first used, and this is distributed as evenly as possible and then allowed to dry. Proper cleaning before application of adhesive allows the desired penetration of the shellac into the body of the sheeting, and this is important to give the proper bond between the separator and glass. After the primary coat has been dried sufficiently, additional coats of shellac may be applied. Ordinarily, fifty to sixty minutes is ample for drying between successive coats. It is important that too much adhesive is not used and the formation of a smooth glossy surface upon the sheeting should be avoided. As indicated in Fig. 6, while the surface of the sheeting 14 is not as rough after the shellac adhesive has been applied, nevertheless after the final coating of adhesive has been put upon the sheeting, the surface should still be relatively rough to give the type of bond illustrated in Fig. 7. After the final coating of shellac or other adhesive is applied, it is permitted to dry to the extent that it can be handled and stripped into the separators without difficulty.

After the glass sheets and separator strips have been secured together to provide a unitary structure, it then becomes necessary to protect the conditions as thus established. The unit must remain air-tight and water-tight, and must resist hygroscopic action from leading any volume of moisture into the air space or the separator material. Further, it must be able to resist the action of the usual oils employed in putty and all other substances to which the glass is subjected when in use. The aim of the invention is the provision of novel means for permanently hermetically sealing the interior of the unit construction from all of these destructive elements as well as protecting the separator strips from weathering and deterioration.

In sealing the unit according to the invention, there is first applied to the edges of the glass sheets and also to the exposed outer edges of the separator strips one or more coats of a suitable sealing material which may be waterproof paint, varnishes, etc. Several coats are preferably applied to the edges of the unit, and while the several coats may be of the same kind of material, they may be of different materials if desired. In Fig. 8 is illustrated the application of three coats 23, 24, and 25, and these coatings may be applied to the edges of the unit by a brush 26. The first coat 23 preferably consists of a good grade of spar varnish which penetrates any cracks or holes which may exist in the separator 12 or in the bond between the separator and the glass. This particular coating does not necessarily have to be water or oil proof or hygroscopic proof, its main function being to provide suitable adhesion to the glass for subsequent coats to be applied. The layer of varnish is allowed to dry for a period of from four to twenty-four hours, depending upon the temperature, humidity, amount of drier in the varnish, and other conditions.

Following this, one or several coatings of rubber paint are applied to the varnish coated edges, and as shown in Fig. 8 two of such coatings 24 and 25 are used. Approximately a twelve hour drying period is allowed between the rubber paint coats. The rubber paint does not in itself adhere well to smooth surfaces such as glass or at least sufficiently well to withstand strains, shocks, and jars to which the glass is subjected when in use. On the other hand, the rubber paint adheres well to the spar varnish and affords protection against moisture, oils and other injurious elements.

The next step in the sealing of the unit is the application of the metal stripping 27 to the edges thereof, said stripping preferably consisting of one or a plurality of strips or ribbons of lead of proper width and thickness. The use of lead is preferred because of its ductility and its capacity for accommodating itself to strains without fracture. Prior to the application of the metal stripping, however, there is applied to one side of the strip or ribbon of lead 27 a coating 28 preferably of the same material as was used for the final coating 25 on the edges of the glass sheets. Thus, if the final coating 25 on the edges of the unit is a rubber paint, then the same rubber paint is used for the coating 28 on the metal stripping. This coating may be applied to the lead strip by means of a brush 29 or in any other desired manner.

After the lead strip 27 has been coated as at 28, the said strip is adapted to be wrapped entirely around the edges of the unit as shown in Fig. 1, with the opposite ends of the strip overlapping one another as at 30. In order to facilitate the securing of the lead stripping to the unit, the apparatus shown in Figs. 10 and 11 may be employed. This apparatus comprises a cylindrical member or pipe 31 heated in any desired manner such as by the passage of steam therethrough. Welded or otherwise suitably secured to the pipe 31 and extending longitudinally thereof is a horizontal, substantially rectangular plate 32 upon the upper surface of which are mounted the spaced longitudinally extending guide strips 33 and 34 secured to the said plate by screws 35 and 36 respectively. It will be noted that the openings 37 in the guide strips 33 and 34, through which the screws 35 and 36 pass, are relatively larger than the said screws so that the said strips may be adjusted toward or away from one another to vary the width of the channel formed therebetween.

In practice, after the lead strip 27 has been coated with the film 28, the said strip is laid horizontally upon the plate 32 between the guide strips 33 and 34 with the coated surface facing upwardly. Upon passage of steam through the pipe 31, the plate 32 will be heated and likewise the lead strip will also be heated to soften the coat of rubber paint or other adhesive thereon. When the metal strip has been sufficiently heated, the glazing unit is placed on edge upon the said strip and the bottom edges of the glass sheets pressed firmly into engagement with the coated surface thereof. This heat and pressure treatment will cause the strip to be secured to the edges of the glass sheets. Although the lead strip will not be uniformly secured to the edges of the glass sheets, it will be caused to adhere thereto at a plurality of points sufficient to permit further handling of the unit. When the lead strip has been tacked to one edge of the unit, the said unit is simply turned ninety degrees and the strip secured in the same manner to a second edge. This is repeated until the metal stripping has been secured to all four edges of the unit.

After the metal stripping has been fastened entirely around the edges of the unit, the unit is subjected to the action of a rotary buffing wheel 38 shown in Fig. 12. This wheel is made of felt or other flexible material and the pressure of the unit on the wheel, coupled with the heat generated by friction between the said wheel and lead stripping as they are moved relative to one another, will be such as to cause the said stripping to be intimately secured throughout its area to the edges of the unit. The heat and pressure acts to soften the adhesive material as well as the lead stripping and thereby renders the lead more pliable so that it will conform to irregular surfaces of the glass sheets. The glazing unit may be moved rapidly across the wheel or the unit may be held in a fixed position and the wheel moved relative thereto.

It is preferred that the air-tight space 11 between the glass sheets be filled with dehydrated air or nitrogen at normal atmospheric pressure, although the pressure of the dehydrated gas may be varied one way or the other to meet particular conditions. The dehydration of the air space may be accomplished in any preferred or well known manner and either before or after the application of the metal stripping to the edges of the unit.

The use of the metal stripping in the construction of the seal 13 results in a seal which, under the pressure differences to be found in practice, may be considered absolutely non-porous and will not permit the passage of moisture in vapor form or the passage of other gases through its structure. By adopting those metals which are not readily oxidized by the oxygen in the air or not normally affected by the dilute gases or chemical combinations to be found in a normal atmosphere, a construction can be produced which, for practical use, may be considered permanent throughout the life of any building construction. The metal stripping serves to effectively protect the separator strips as well as the bond between the said strips and glass from the atmosphere and also from other injurious substances to which the unit may be subjected in use.

I claim:

1. A multiple glass sheet glazing unit of the character described, comprising a plurality of spaced sheets of glass, fabric faced yieldable separator strips having serrated surfaces bonded between the glass sheets entirely around their perimeters to form a dead air space therebetween, and a protective metal seal including metallic stripping extending entirely around the edges of the glass sheets and cemented thereto.

2. A multiple glass sheet glazing unit of the character described, comprising a plurality of spaced sheets of glass, fabric faced yieldable separator strips having serrated surfaces bonded between the glass sheets entirely around their perimeters to form a dead air space therebetween, and a protective metal seal including metallic stripping extending entirely around the edges of the glass sheets, and a layer of adhesive material interposed between said metal stripping and sheet edges.

3. A multiple glass sheet glazing unit of the character described, comprising a plurality of spaced sheets of glass, yieldable separator strips formed of rubber compound and fabric laminations having serrated surfaces bonded between the glass sheets entirely around their perimeters to form a dead air space therebetween, and a protective metal seal including metallic stripping extending entirely around the edges of the glass sheets and cemented thereto.

4. A multiple glass sheet glazing unit of the character described, comprising a plurality of spaced sheets of glass, yieldable separator strips formed of rubber compound and fabric laminations having serrated surfaces bonded between the glass sheets entirely around their perimeters to form a dead air space therebetween, and a protective metal seal including metallic stripping extending entirely around the edges of the glass sheets, and a layer of adhesive material interposed between said metal stripping and sheet edges.

5. A multiple glass sheet glazing unit of the character described, comprising a plurality of spaced sheets of glass, yieldable separator strips bonded between the glass sheets at spaced points entirely around their perimeters to give an interrupted type of bond and provide a dead air space therebetween, and a protective metal seal including metallic stripping extending entirely around the edges of the glass sheets and cemented thereto.

6. A multiple glass sheet glazing unit of the character described, comprising a plurality of spaced sheets of glass, yieldable separator strips bonded between the glass sheets at spaced points entirely around their perimeters to give an interrupted type of bond and provide a dead air space therebetween, and a protective metal seal including metallic stripping extending entirely around the edges of the glass sheets, and a layer of adhesive material interposed between said metal stripping and sheet edges.

7. A multiple glass sheet glazing unit of the character described, comprising a plurality of spaced sheets of glass, yieldable separator strips bonded between the marginal portions of the glass sheets and arranged substantially flush with the peripheral edges thereof, a layer of adhesive covering the edges of the glass sheets and the separator strips, and a protective metal seal including metallic stripping extending entirely around the glass sheets and secured by said layer of adhesive to the edges of the said sheets and also to the separator strips.

8. A multiple glass sheet glazing unit of the character described, comprising a plurality of spaced sheets of glass, separator strips secured between the marginal portions of the glass sheets, a layer of adhesive covering the edges of the glass sheets and the separator strips, and a protective metal seal including metallic stripping extending entirely around the glass sheets and secured by said layer of adhesive to the edges of the said sheets and also to the separator strips.

CHARLES D. HAVEN.